United States Patent [19]

Ishibashi et al.

[11] Patent Number: 5,270,811
[45] Date of Patent: Dec. 14, 1993

[54] TELEMETRY MONITORING METHOD AND DEVICE THEREFOR FOR TRANSMITTING INFORMATION BY MEANS OF ASYNCHRONOUS TRANSFER MODE TECHNIQUE IN BROADBAND ISDN

[75] Inventors: Ryoichi Ishibashi; Toshimasa Fukui, both of Yokohama, Japan

[73] Assignee: Fujitsu Limited, Kawasaki, Japan

[21] Appl. No.: 718,794

[22] Filed: Jun. 21, 1991

[30] Foreign Application Priority Data

Jun. 21, 1990 [JP] Japan ................................ 2-163633

[51] Int. Cl.⁵ ............................................... H04N 7/18
[52] U.S. Cl. ..................................... 358/108; 370/94.1
[58] Field of Search ...................... 358/108, 105, 141; 340/588, 589, 870.16, 870.17, 518; 370/13, 79, 94.1, 110.1

[56] References Cited

U.S. PATENT DOCUMENTS

| | | |
|---|---|---|
| 4,101,872 | 7/1978 | Pappas . |
| 4,249,207 | 2/1981 | Harman et al. ................. 358/105 X |
| 4,317,130 | 2/1982 | Brown ................................. 358/108 |
| 4,623,876 | 11/1986 | Shima et al. ............... 340/870.16 X |
| 4,679,077 | 7/1987 | Yuasa et al. ..................... 340/518 X |
| 4,884,222 | 11/1989 | Nagashima et al. ............ 340/589 X |
| 4,999,614 | 3/1991 | Ueda et al. ............................ 340/588 |
| 5,007,045 | 4/1991 | Tsuzuki ............................... 370/94.1 |
| 5,050,163 | 9/1991 | Van Bavel et al. ................ 370/94.1 |
| 5,070,498 | 12/1991 | Kakuma et al. ............... 370/94.1 X |

OTHER PUBLICATIONS

IEEE Global Telecommuncations Conference & Exhibition, Nov. 28-Dec. 1, 1988 vol. 1, New York, USA. Käser et al: "International Standards for Broadband Aspects of ISDN".

NTT Review. vol. 1, No. 2, Jul. 1989, Tokyo JP Yasushita Ikeda: "Scope Port D64" Image Monitoring System via the INS-Net.

*Primary Examiner*—Victor R. Kostak

[57] ABSTRACT

A telemetry supervisory system in an asynchronous transmission mode network which discriminates less information when less variation rates occur and more information when more variation rates occur, and provides a transmission system for transmitting the discriminated information as a cell having a fixed length, includes an object detecting and monitoring device, a coder for coding picture signals from the detecting and monitoring device, a transmission unit which changes the output of the coder into cells each having a fixed length and a monitor station. Monitoring information such as a picture image or sound from a monitored object is transmitted by the transmission unit for a discrimination of the information. A number of cells transmitted as data is monitored at the receiving side, e.g. monitor station, and a variation of the number of cells is treated as a change in the state of the monitored object.

8 Claims, 6 Drawing Sheets

TELEMETRY MONITORING METHOD AND DEVICE THEREFOR FOR TRANSMITTING INFORMATION BY MEANS OF ASYNCHRONOUS TRANSFER MODE TECHNIQUE IN BROADBAND ISDN

BACKGROUND OF THE INVENTION

1. Field of the Invention

The present invention relates to a telemetry monitoring method and a device therefor for transmitting information by means of asynchronous transfer mode technique in a broadband integrated services digital network (B-ISDN).

Information from an apparatus for recording the readings of an instrument that is at a distance is transmitted in a cell form or in a fixed length packet form in a broadband integrated services digital network (abbreviated as B-ISDN). Accordingly, if the amount of information is increased, the number of cells is also increased. Note the case of a telemetric monitoring system, encoded data such as a picture and a speech are transmitted after a compression thereof.

2. Description of the Related Art

In general, a conventional telemetric monitoring apparatus includes a means for transmitting data of a picture, a sound or the like of a monitoring object by utilizing a communication circuit; a means for receiving the transmitted data by a monitoring device disposed at a distance; and a means for determining a normal or an abnormal state, through monitored pictures of the monitoring device, by a supervisor. Data of the picture or the sound of the monitoring object are collected by a television camera or a microphone. Alternatively various kinds of sensors may be arranged at separate parts of the monitoring object, and the outputs of these sensors delivered via a communication line.

A telemetry monitoring system through which a supervisor observes a monitoring picture, to thereby discriminate a normal state or an abnormal state, is manually operated and it is difficult to automate such a system. Accordingly, the costs of such a system are high, and often produces delays or a non-detection of an emergency. Often, alarm information is output from each sensor, i.e., an alarm is output when a sensor output becomes higher than a predetermined level when an emergency or accident occurs.

Nevertheless, such an output of alarm information is disadvantageous in that it takes a long time to determine the cause thereof after the alarm information has been received and displayed.

The Integrated Services Digital Network (abbreviated by ISDN) is one of the most important communication technique which supports an infrastructure (a social industrial subordinate parts) in a high-level information architecture society. One of the advanced ISDNs is a B-ISDN (broadband ISDN) which treats up to 150–600 Mbps signals. But the issue point that the present circuit switching system cannot overcome is switching system. Then, an asynchromous transfer mode (ATM) technique that is similar to a prior art packet exchange is developed and is the focus of the world's attention. Also, in the prior art synchronous transfer mode (STM) technique, a frame is constituted by a definite number of time slots and since one channel is used to utilize a particular time slot in a frame periodically, it is disadvantageous that information transmission speed is fixed to a definite value. The ATM technique is intended to eliminate such drawbacks.

In ATM communication, transfer information is divided into a fixed length of slot blocks to transfer and process. The fixed length of blocks for a unit of information is called a cell. The cell is divided into two kinds of parts; one is a region for storing transfer information per se and the other is a region in which information concerning a control for transferring cells is stored. The latter is regarded as a header which has a fixed length of a predetermined format and is added before an information field.

Multiplex communication per cell unit is carried out in an ATM device. Information within a header is employed in order to discriminate an address of cells which is multiplexed on a transmission line. Based on the existence of transfer information to some address, cells are delivered asynchronously. If information to be transferred is vacant, a vacant cell having no information in the information field is delivered. Therefore, a fixed length of cells are flowing continuously including the case of no information to be transferred. An observation of a header in a cell enables discriminating whether a cell is vacant or not and whether or not it is a cell including information of a logic channel in response any address.

As described above, a header includes address to multiplex or exchange thereby. In a conventional packet exchange system, a packet is of a variable length, and packet exchange is processed by a software, whereas since an ATM device is of a definite length, a cell appears periodically and the detection and exchange of cells are realized by a hardware to effect a high speed processing. A conventional circuit switching network has disadvantages that once a speed is determined it cannot be changed dynamically and must be a multiply of 64 K bit/sec, whereas if the number of cells delivered in ATM system is regulated to change a communication speed, the communication speed can be selected freely to set it dynamically.

The present invention has been devised as a way of eliminating such problems.

SUMMARY OF THE INVENTION

Therefore, an object of the present invention is to enable a telemetry monitoring system to be automated, and to thereby reduce the labor required, and to detect an emergency or accident of an earliest stage.

In accordance with a feature of the present invention, there is provided a telemetry supervisory system in an asynchronous transmission mode network which discriminates less information when less variation rate occur and more information when more variation rates occur, and provides a transmission system for transmitting the discriminated information as a cell having a fixed length, wherein monitoring information such as a picture image or sound from a monitored object is transmitted for a discrimination of the information, a number of cells transmitted as data is monitored at the receiving side, and a variation of the number of cells is treated as a change in the state of the monitored object.

At the receiving side, the number of cells received is monitored and a normal state or an abnormal state detected based on a change of the number of cells per unit of time.

In the present invention, the number of cells is counted at the receiving side, and an alarm data signal is produced according to the counted number. For example, when the counted number is more than a predetermined number, a pilot lamp is turned ON, a buzzer alarm is sounded, or a picture image is displayed on a monitoring screen.

In accordance with a telemetry monitoring system of the present invention, since a change of a number of transmitted cells is a variation of information on a monitored object, a precise alarm signal can be transmitted.

When the information to be transmitted is, for example, a temperature of the monitored object, a value of the temperature per se is transmitted as cell data, and a change thereof as is recorded as a variation of a number of the transmitted cells. At the receiving side, the cell data and the variation of a number of transmitted cells are received, and when the variation of a number of transmitted cells is more than a predetermined value, a pilot lamp is turned ON, a buzzer alarm is sounded, and the current temperature thereof is indicated at a display unit.

Also, when the information to be transmitted is a picture image of the monitored object, a difference between a prior picture image and a current picture image is transmitted as cell data, and the difference therebetween (variation speed) is transmitted as a variation of the number of cells. This information is received at the receiving side, and when the variation of the number of transmitted cells is more than a predetermined value, a buzzer alarm is sounded and the picture image is shown on the screen of the display unit. Therefore, the supervisor need only listen for the sound for the buzzer, look at the display, and visually check whether or not the monitored object is in a normal state. When there is no change, a picture image is not shown on the display unit and therefore, since the supervisor does not have to constantly observe the display or monitor same, and thus a fatiguing of the supervisor is eliminated, and therefore, the number of monitored objects observed by one supervisor can be increased.

Accordingly, an advantage of a saving of labor and low costs is obtained, and further, an accident or an emergency is detected with a greater speed and precision.

BRIEF DESCRIPTION OR THE DRAWINGS

PREFERRED EMBODIMENTS OF THE INVENTION

Figure 1:
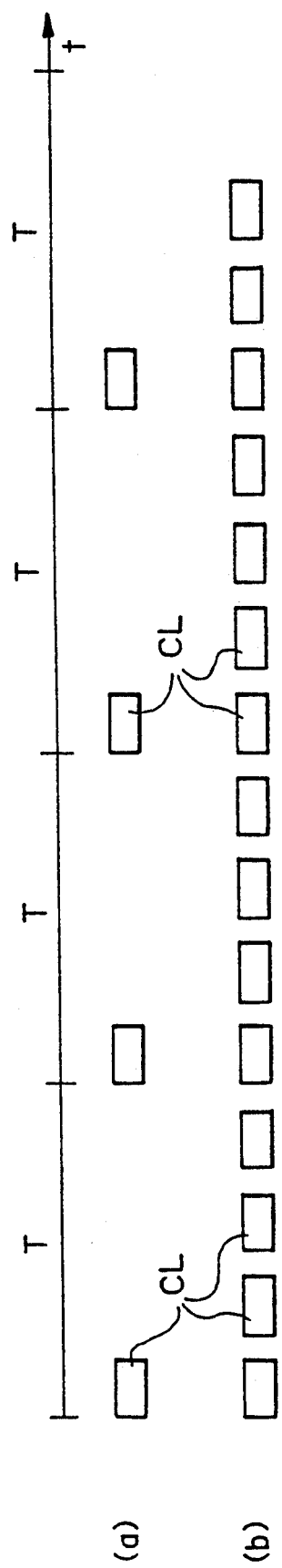
FIG. 1 shows a diagram of a variation rate of cells per unit of time, wherein FIG. 1 (A) is a diagram of a group of cells which are transmitted when a variation of the rate does not occur frequently, and FIG. 1 (B) is a diagram showing a group of cells which are transmitted when a variation of the rate frequently occurs, where T represents a unit of time.
Figure 2:
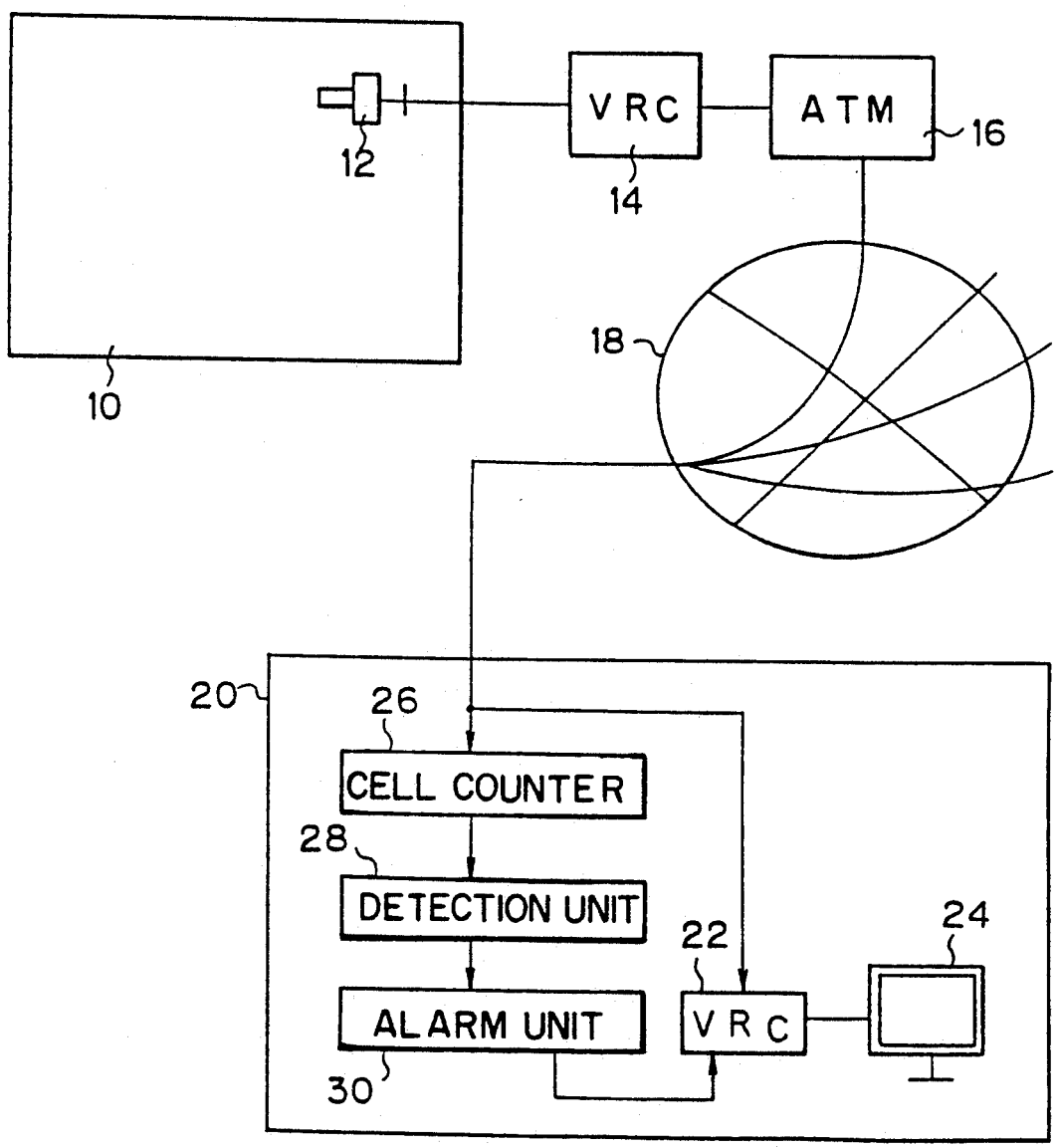
FIG. 2 is a schematic block diagram showing an embodiment of the present invention, when applied to remote-control security system.

In FIG. 2, reference numeral 10 denotes a monitored object, for example, an office which is to be monitored, more particularly, a space within the office, and 12 denotes a television camera mounted within the office. The output of the TV camera is encoded by a variable rate CODEC device (VRC) 14, and then output by an asynchronous transmission mode device (ATM) 16 and delivered to a monitoring station 20, in this case to a security company, via a communication network 18.

The delivered signal is decoded by a variable rate CODEC device (VRC) 22 at a monitoring station 20, and the output thereof input to a display unit (a monitoring CRT) 24. Alternatively, transmitted data of a number of cells per unit of time is counted by a counter 26, and the difference between a prior number of cells and a current number of cells per unit time is detected by a detection unit 28. An alarm portion 30 receives an output of the detection unit 28, and when the value of the detected difference is more than a predetermined value, the VRC 22 is informed of an abnormality by an abnormality informing portion 30, and is activated thereby, and accordingly, a picture image of the monitored object 10 is then displayed on a monitoring screen 24.

In another variable rate CODEC (VRC) mode, when there is no change in a picture image, less information is delivered, and when a change in the picture image occurs, more information is delivered in response to a magnitude of a variation thereof; this is called a variation encoding system. Since a cell in the broadband integrated services digital network (B-ISDN) has a fixed length, such information depends on the value of a number of cells transmitted.

In a normal case, the office is not manned at night and a picture image taken by a crime prevention camera 12 does not change, and therefore, the number of cells delivered is low. In an emergency case, however, e.g., if an intruder enters the office, a change occurs in a picture image and the difference between a prior image and the current image is transmitted, and thus the number of transmitted cells is increased. The counter 26 counts the cells and the detection unit 28 detects the rate of increase thereof and when the amount of increase is more than a predetermined value, the alarm informing portion 30 outputs an alarm signal. Upon receiving the alarm signal, a picture image is shown on the monitoring screen 24, and a supervisor then observes the screen and is able to discriminate a normal state from an abnormal state.

The supervisory station is generally a central supervisory station to which picture images are sent of many monitored objects, and these pictures are shown on respective monitoring screens. Therefore, it is not easy to closely observe so many picture images displayed on a multitude of monitor screens, and thus it is difficult to rapidly determine a variation (abnormal state) shown on one of the many monitor screens. As shown in an embodiment of the present invention, when an abnormal state is produced at a level higher than a predetermined value, the picture image concerned is shown on the relevant monitoring screen; until that time, the monitoring screen does not display a picture image. By adopting such a procedure, a supervisor is easily able to sense an approaching abnormal state, and thus only one supervisor can easily constantly observe a large number of monitoring screens.

Note, in this case, both methods, i.e., turning ON a pilot lamp and sounding a buzzer, may be used.

Also a supervisor can manually display a required picture image of monitored object on the monitoring screen. Alternatively, the above-noted predetermined value for outputting an alarm may be made variable, to cause a display even when a minute variation occurs or to stop a display unit unless a large variation occurs.

Figure 3:
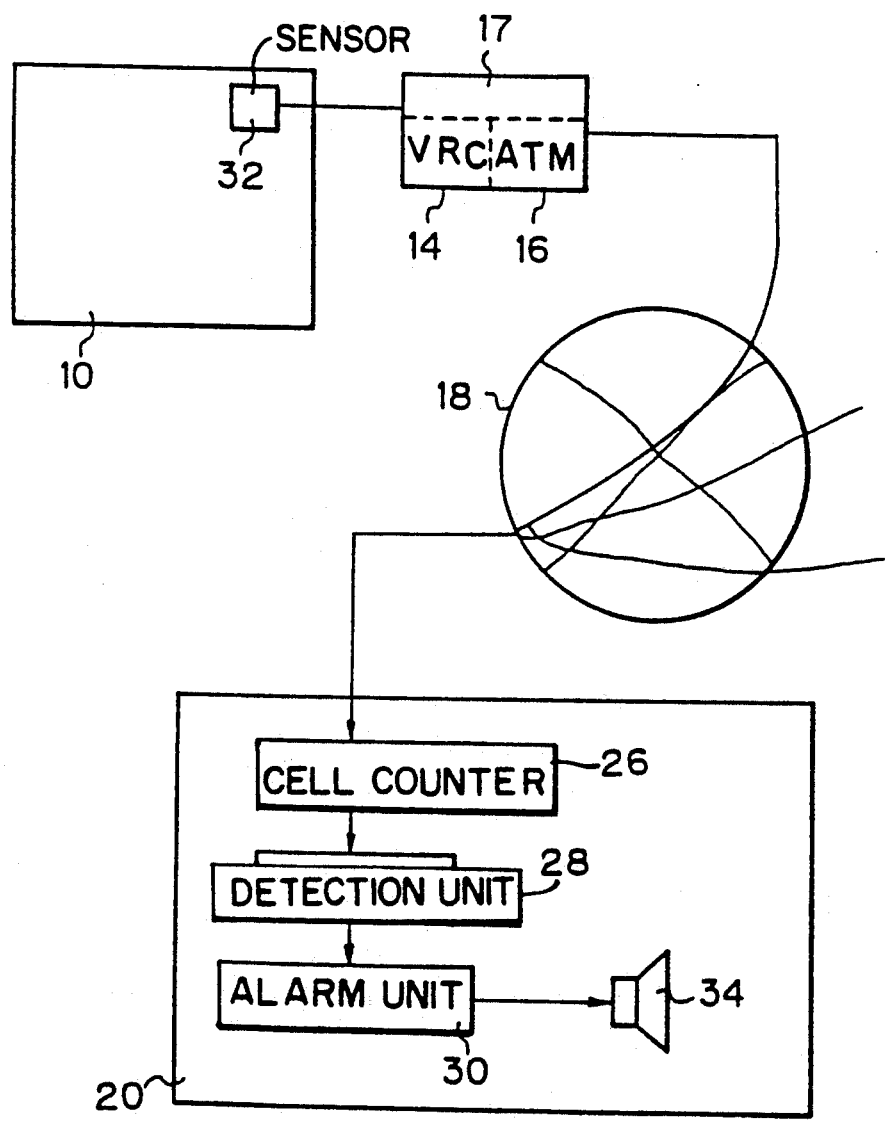
FIG. 3 is a schematic block diagram showing an embodiment of the present invention, when applied to the case of a fine alarm.

FIG. 3 is a diagram showing an embodiment when the invention is utilized in the case of a fire alarm. A monitoring object 10, for example, the temperature of a room at usual home is monitored by a sensor 32 and it is devised that the greater the rise of a room temperature per unit time is, the more the number of transmitted cells in creases. For example, when received a temperature data detected by the sensor 32, when the difference between the last time temperature and the present temperature does not exist at all or so much, the delivery of information (The value of temperature or the difference of the temperature is preferable, but we may make do with a simple sign or code) is thinned out and a circuit design is devised such that the larger the difference is, the more the delivery frequency is increased.

The number of received cells is counted at a monitoring station (at the receiving side) 20 and if the number of cells denotes an increase over a predetermined value, an alarm is produced from a speaker 34. In this embodiment of the present invention, information included in a cell or information within a cell is a non-objective one which is not useful or meaningless and the number of cells corresponds to an alarm signal, but information within a cell may be selected as a value of temperature, an indoor sound, a smoke information or the like may be selected. Such being the case, these monitored information may be broadcasted from a speaker.

Figure 4:
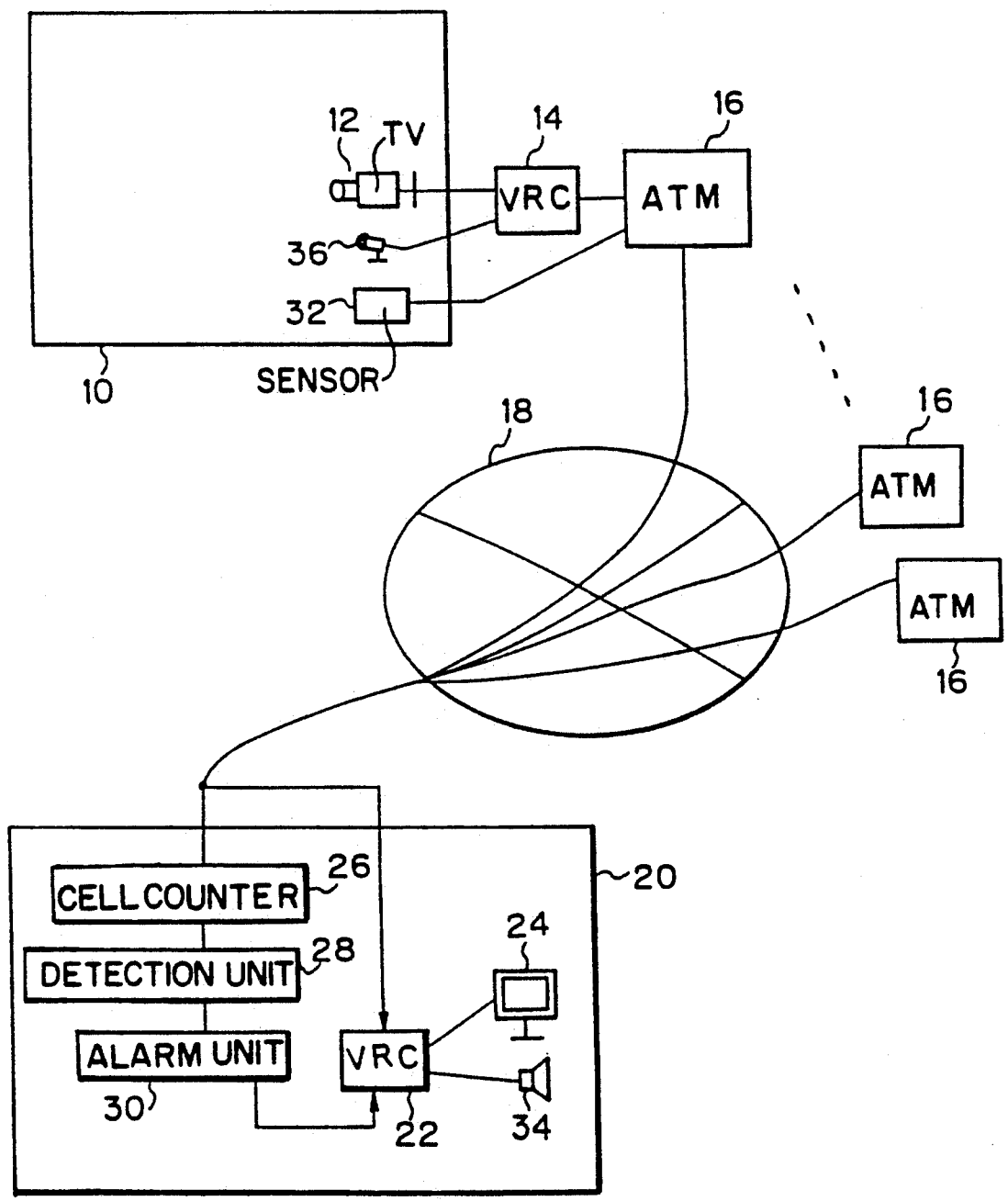
FIG. 4 is a schematic block diagram showing an embodiment of the invention having a plurality of monitoring objects.

FIG. 4 is a block diagram showing another embodiment of the invention having a plurality of monitoring objects. In FIG. 4, a monitoring object 10 includes a television camera 12, a set of sensors 32 and a mocrophone 36, where a set of sensors 32 further include a sensor for measuring temperature, a sensor for checking whether the door is locked by a key or not, and a sensor for checking whether the window is closed or open. The sensor enables effecting a valid monitoring against a fire or an intruder. The number of transmitted cells is also responsive to a variation rate and the information of a picture image, a sound, a temperature and so on, is packaged in the cell.

The number of monitoring object is not limited to only one, but a plurality of monitoring objects may be employed with a switching means contained in either monitoring object. In this case, whenever an alarm signal is informed, a switching to a picture image of the relevant monitoring object may be possible. If the supervisor can not find an abnormal state on a monitoring screen of a display unit, a return operation to a normal state which a picture image does not appear, may be preferred.

Figure 5:
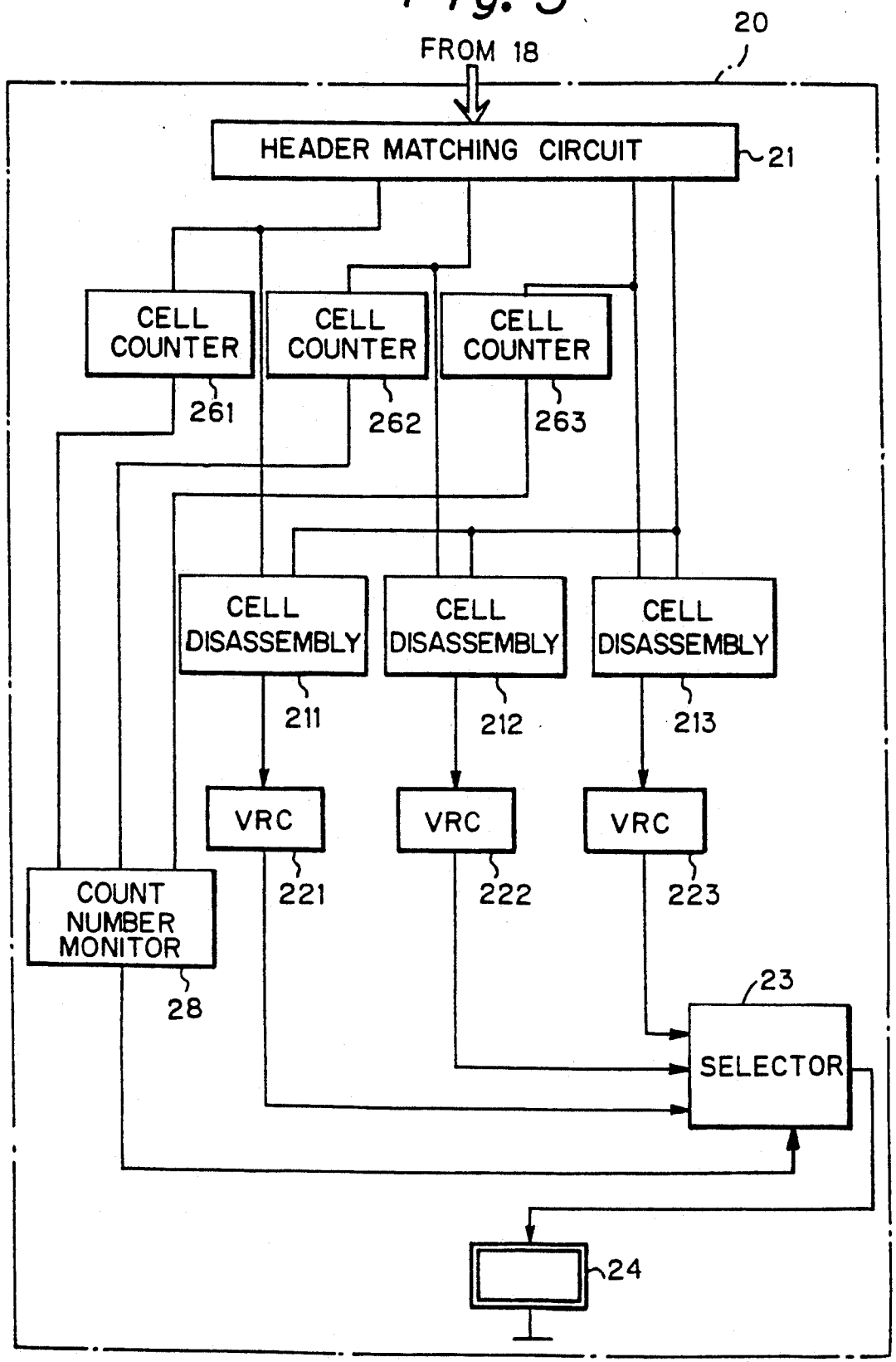
FIG. 5 is a detailed block diagram of a monitoring station in FIG. 2.

FIG. 5 is a obtained is a detailed block diagram of a monitoring station 20 in FIG. 2.

In FIG. 5, the output of the network 18 is sent to a header matching circuit 21 of a monitoring station 20. The output in a header matching circuit 21 sends each header coincidence signal of the circuit 21 to a respective cell number counter 261 to 263. At the same time, each input of the cell number counters 261 to 263 is sent to a respective cell disassembly circuit 211 to 213. Each picture signal as the output of the VRC decoder 221 to 223 is sent to a selector 23 to select a desired picture and then is sent to a display unit 24.

On the other hand, each data from the header matching circuit 21 is sent to the cell disassembly circuit 211 to 213. The outputs of the cell number counters 261 to 263 is sent to the count number monitor or detector 28 where the increase of the count value is detected. The output of the count number monitor 28 is sent to the selector 23. In practice, the count values of the cell number counter 261 to 263 are read and when the count value surpasses a threshold value, a picture image signal is selected.

Figure 6:
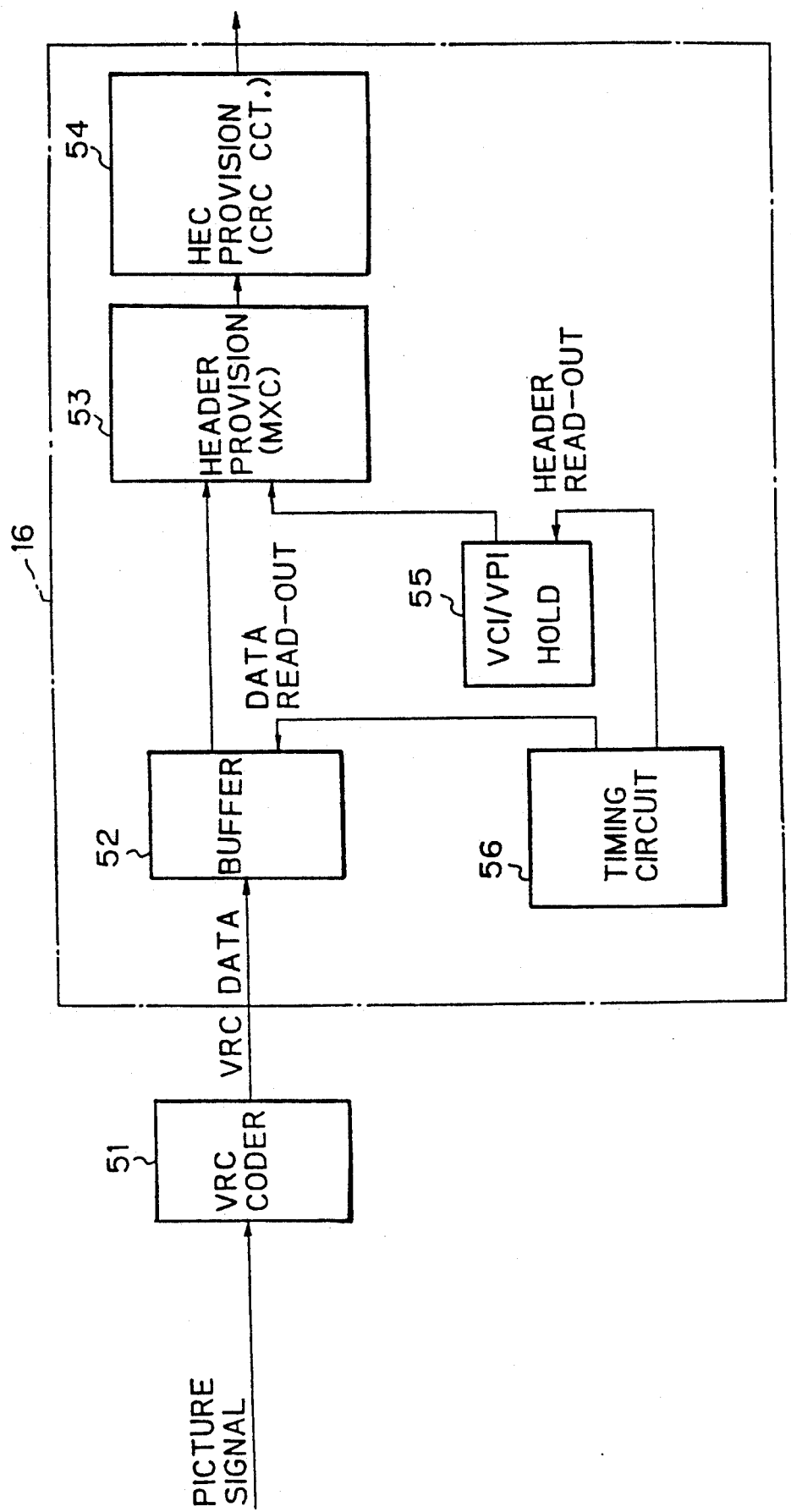
FIG. 6 is schematic block diagram showing a cell assembly circuits in FIG. 2.

FIG. 6 is a schematic block diagram showing a cell assembly circuit 16 in FIG. 2.

In FIG. 6, a picture signal is sent to a VRC coder 51 and the output of the VRC coder 51 is input to a buffer 52 to store VRC data therein.

One of the signals produced from a timing circuit 56 is sent to a buffer 52 and the other of them is sent to a VCI/VPI Hold circuit 55 to receive a header read-out signal from the timing circuit 56. The output of hold circuit 55 and the output of the buffer 52 are multiplexed in a header provision circuit 53 and the multiplexed signal is sent to a cyclic redundancy check code circuit 54 to add a header error control signal.

A VCI signal in 55 is a virtual channel identifier signal which identifies a channel is a network. A VPI signal in 55 is a virtual pass identifier signal which identifies a password in a network. A combination of VCI and VPI carries out a response to an address to which a cell is to be transmitted.

A CRC denotes a cyclic redundancy check code which an input signal is divided by a generation polynomial and a residue thereof is added by means of the CRC code. A HEC denotes a header error control and the CRC is counted in response to four bytes of a header and put in a field of this header. A detection/correction of bit errors in a header can be carried out thereby.

Regarding the image processing, each information sent from the buffer 52 and each VCI/VPI data sent from the VCI/VPI hold circuit 55 are paired therewith, i.e., VRC coded data is multiplexed with VCI/VPI data and HEC (header error control) data is added to the multiplexed data in the HEC provision circuit 54 to be sent to a network 18.

Therefore, it is seen that header data which is obtained by destination VCI/VPI data is added to the image information to be sent to the network.

We claim:

1. A telemetry supervisory system for transmitting information by means of an asynchronous transfer mode technique in a broad band integrated services digital network, the system comprising:

means for detecting an object and monitoring a state of the object in an enclosed space;

coding means connected to said detecting and monitoring means for coding video data of the monitored object to a variable code length;

a transmission unit connected to said coding means for changing an output of said coding means into cells each having a fixed length; and a monitor station;

said transmission unit transmitting said cells to aid monitor station in an asynchronous transmission mode via a communication network;

said monitor station including:

a cell number counter for counting a number of cells per unit time received from said monitored object through said transmission unit; and cell number increase detection means connected to said counter and outputting an alarm signal which identifies a monitored object when a number of cells counted by said cell number counter is larger than a predetermined value.

2. A telemetry supervisory system according to claim 1, wherein said coding means is a variable rae CODEC system and said counter counts the number of cells to provide a detection of a variation of a video data or a change of a picture image transmitted from said detecting and monitoring means to said monitor station via said communication network.

3. A telemetry supervisory system according to claim 1, wherein said means for detecting an object include a TV camera, said transmission unit includes an asynchronous transmission mode device and said monitor station includes a variable rate CODEC device (VRC) and an abnormality informing unit including an alarm means, and whereas an output of said TV camera is encoded by said variable rate CODEC device (VRC), then output by said asynchronous transmission mode device, and delivered to said monitor station, said alarm means receiving an output of said detection means, and when the value of a detected difference between an output of said VRC and the output of said detection means is more than a predetermined value, said VRC is informed of an abnormality by said abnormality informing unit.

4. A telemetry supervisory system according to claim 1, wherein coding means includes a VRC coder receiving a picture signal from said detecting means, said transmission unit including cell assembly means, wherein said cell assembly means includes:

a buffer for inputting an output of said VRC coder to store VRC data therein, a VCI/VPI hold circuit, a timing circuit connected to said buffer for delivering at least one signal to said buffer and another of signals to said VCI/VPI hold circuit to receive a header read-out signal therefrom, a cyclic redundancy check code circuit, and a multiplexer circuit for multiplexing an output of said VCI/VPI hold circuit and an output of said buffer to send a multiplexed signal to said cyclic redundancy check code circuit to add a header error control signal thereto.

5. A telemetry supervisory system according to claim 4, wherein said VCI/VPI hold circuit is constructed to process a VCI signal as a virtual channel identifier signal which identifies a channel as a network.

6. A telemetry supervisory system according to claim 4, wherein said VCI/VPI hold circuit is constructed to process a VPI signal as a virtual pass identifier signal which identifies a password in a network.

7. A telemetry supervisory system according to claim 4, wherein said VCI/VPI hold circuit is constructed to process a combination of a VCI and VPI signal, which corresponds to an address to which a cell is to be transmitted.

8. A telemetry supervisory system for transmitting information by means of an asynchronous transfer mode technique in a broad band integrated services digital network, the system comprising:

means for detecting an object and monitoring a state of the object in an enclosed space;

coding means connected to said detecting and monitoring means for coding video signals of the monitored object to a variable code length;

a transmission unit connected to said coding means for changing an output of said coding means into cells each having a fixed length; and a monitor station;

said transmission unit transmitting said cells to said monitor station in an asynchronous transmission mode via a communication network;

said monitor station including:

a plurality of cell number counters for counting a number of cells per unit time received from said monitored object through said transmission unit, a header matching means for receiving an output of said communication network and sending each header coincidence signal to a respective cell number counter, cell disassembly means for receiving outputs of said header matching means to obtain cell data based on a coincidence of headers, VRC decoder means for receiving an output of said cell disassembly means to decode coded signals received therefrom, a display unit, selector means for receiving an output of said VRC decoder means as picture signals, selecting a desired picture and sending said picture to said display unit, and cell number increase detection means connected to said counters and outputting an alarm signal which identifies a monitored object when a number of cells counted by the respective cell number counter is larger than a predetermined value.

* * * * *